Patented Jan. 9, 1934

1,943,123

UNITED STATES PATENT OFFICE 1,943,123

PROCESS OF WELDING

Willy Kreutz, Duren, Germany, assignor to Felix Schull, Duren, Germany

No Drawing. Application October 9, 1931, Serial No. 567,982, and in Germany November 11, 1930

1 Claim. (Cl. 219—10)

My invention relates to a process of welding and more particularly to a novel process of electrical resistance welding and consists essentially therein that I enclose the work-piece to be welded within a flame which contains carbon in excess, said flame being applied simultaneously with the electric current which is passed through said work-piece.

The process of electrical resistance welding is carried out ordinarily in such a way that the parts to be joined with each other are heated to welding temperature by passing an electric current therethrough and by thereupon upsetting or jolting the surfaces to be welded against or into each other, while being soft at welding temperature for properly producing the welded joint. This upsetting or jolting of the surfaces to be united by welding which had heretofore been an absolute necessity in order to obtain a proper and solid weld, however, results in the formation of a ridge or projection on the butt or lap of the welded joint. Ridges or projections on the welded joint present a great disadvantage as they must be removed by subsequent working or finishing which renders the entire procedure cumbersome and expensive, especially when welding articles in large quantities automatically, because special device are always necessary for this purpose.

My new process avoids the aforementioned disadvantages which had heretofore been generally connected with electrical resistance welding and permits to produce welds which are absolutely free of any ridges or projections and able to positively withstand any tensile strains which may be exerted on the welded joint. According to my invention this is accomplished, as above mentioned, essentially by enclosing the parts to be joined with each other by electrical resistance welding within a flame which contains carbon in excess, with the result that carbon will be caused to deposit on the surfaces to be welded with each other.

This depositing of carbon now will reduce the melting point of the material at said surfaces with the further result that said surfaces will be caused to properly flow into each other and to produce a greatly improved joint which is free of ridges, projections and slags, thus dispensing with any subsequent treatment.

I am aware of the fact that a flame had been used at the earliest stages of electrical resistance welding. At that time, however, a flame had to be used merely as an additional source of heat on account of the fact that the sources of electric current then available were entirely insufficient to produce the amount of heat necessary for properly carrying out a process of electrical resistance welding.

Of secondary importance when using this process it was that sometimes the formation of oxide was avoided. In the further development of the art of the electrical resistance welding it was tried to avoid the formation of oxide in that way that the surfaces to be welded with each other were enclosed by a current of gas.

However all these processes were very cumbersome and expensive and as with the progress of engineering the sources of the electric current became sufficient to produce the necessary amount of the heat for welding only on the electrical way, now since may years this process of electrical resistance welding is generally carried out as mentioned before, i. e. that the pieces to be welded with each other are only heated by means of the current passed therethrough to welded temperature and that the pieces are pressed or jolted in this state against or with each other.

My new process of electric resistance welding may be used with advantage in connection with a process of electrical welding carried out by hand or also in connection with an automatic process. When carrying out the process in an automatic way, the aforementioned flame which is used according to my invention may preferably be controlled by the welding machine in such a manner that said flame which acts upon the work-piece, for instance by means of one or more nozzles, is caused to be operative only during the process of welding. By reason of the simplified process of welding and the simplified devices required therefor due to avoiding any upsetting or jolting of the surfaces to be welded and any removal of ridges or projections from the welded places of the work-piece my new process of welding will produce a high-grade weld and may be carried out more easily and considerably cheaper than had heretofore been possible. In addition to this, my new process may be used for welding most different work-pieces with each other.

I claim:

Process for electric welding work pieces without the formation of a ridge on the weld, which consists in subjecting the contacting faces of the work pieces to be welded, to the action of an electric current at welding temperature without pressing the contacting faces towards each other, and simultaneously passing a flame over the surfaces containing an excess of carbon for depositing carbon on the surfaces to be welded, continuing the passage of said current during the reduced melting point of the material resulting from the presence of the deposited carbon, until the faces are fused together, whereby a weld is produced without formation of ridges or slags at the weld.

WILLY KREUTZ.